United States Patent [19]

O'Neill et al.

[11] Patent Number: 5,360,288
[45] Date of Patent: Nov. 1, 1994

[54] CLEANER TOOTH FOR COMPACTING MACHINES

[75] Inventors: William N. O'Neill, East Peoria; John J. Bloom, Jr., St. Charles; Joe M. Bexson, Jr., Aurora, all of Ill.

[73] Assignee: Caterpillar Inc., Peoria, Ill.

[21] Appl. No.: 122,991

[22] Filed: Sep. 20, 1993

[51] Int. Cl.⁵ .................. A01B 29/06; E01C 19/26
[52] U.S. Cl. .................. 404/129; 37/452; 404/121
[58] Field of Search .............. 404/90, 121, 124, 129; 172/540, 47, 554, 122, 610; 301/43, 44.1; 280/855; 37/446, 452, 454, 455; D15/28, 29

[56] References Cited

U.S. PATENT DOCUMENTS

| D. 290,613 | 6/1987 | Ryan ................. D15/29 X |
|---|---|---|
| 1,229,868 | 6/1917 | Black . |
| 1,933,679 | 11/1933 | Nicewander et al. ......... 280/158 |
| 1,942,655 | 1/1934 | McCormick et al. ......... 280/158 |
| 2,579,839 | 12/1951 | Torneau ................. 55/47 |
| 3,063,177 | 11/1962 | McAdams et al. ......... 37/146 |
| 3,067,658 | 12/1962 | Palmiter ................. 94/50 |
| 3,085,484 | 4/1963 | McAdams et al. ......... 94/50 |
| 3,183,804 | 5/1965 | Torneau ................. 94/50 |
| 3,554,101 | 1/1971 | Grant et al. ............. 404/129 |
| 3,922,106 | 11/1975 | Caron et al. ............. 404/121 |
| 3,988,071 | 10/1976 | Cochran et al. .......... 404/129 |
| 4,523,873 | 6/1985 | Elliot .................. 404/124 |
| 4,530,620 | 7/1985 | McCartney ............. 404/121 |
| 4,858,699 | 8/1989 | Poltrock ............... 172/558 |

FOREIGN PATENT DOCUMENTS

| 3723126 | 6/1927 | Australia .............. 280/855 |
|---|---|---|
| 3431333 | 8/1984 | Germany .............. 172/547 |

OTHER PUBLICATIONS

Caterpillar Brochure: CP-323 CS-323 Padded Drum and Smooth Drum Vibratory Soil Compactors, Publ. No. QEHQ2993 dated Jan. 1987.

Primary Examiner—Ramon S. Britts
Assistant Examiner—James A. Lisehora
Attorney, Agent, or Firm—J. W. Burrows

[57] ABSTRACT

Cleaner teeth or bars are used in many applications to remove debris from a compacting wheel that is wedged between respective rows of compacting tips. It is advantageous to have a cleaner tooth that is simple in construction and effective to remove the debris with the least amount of effort. In the subject arrangement, a cleaner tooth is provided having an arcuate upper surface that, in use, is located immediately adjacent an outer peripheral surface of a compacting wheel and has a trailing lower surface that intersects the arcuate outer surface at a forward end portion thereof. The forward end portion is effective to remove the debris with minimal effort. A fastening portion provides a structure which allows ease of assembly and disassembly of the cleaner tooth to a compacting machine.

5 Claims, 3 Drawing Sheets

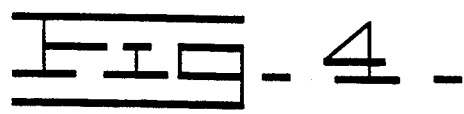
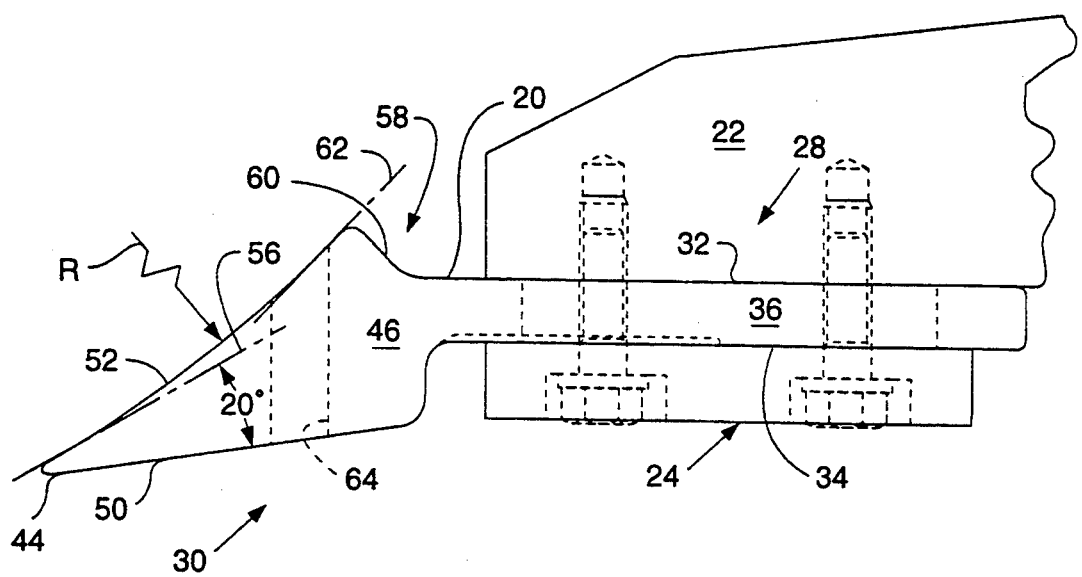
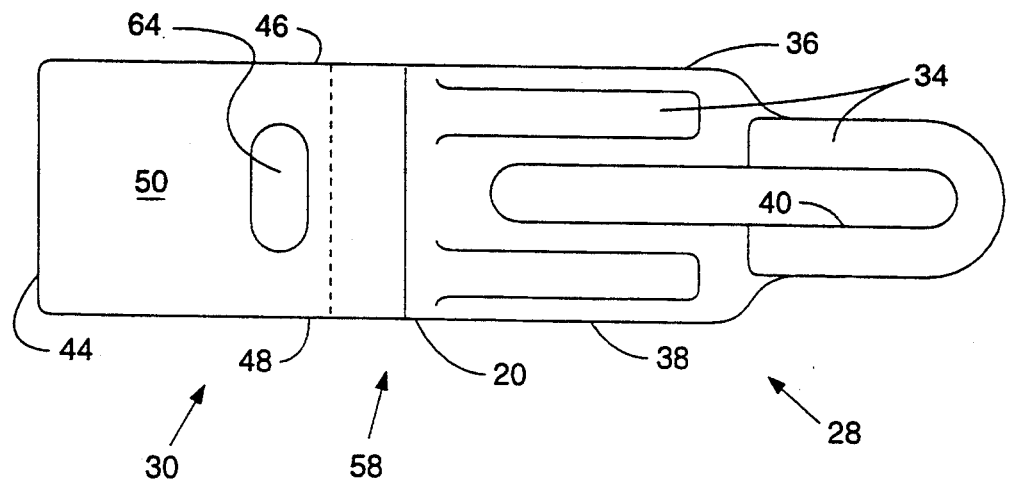

CLEANER TOOTH FOR COMPACTING MACHINES

TECHNICAL FIELD

This invention relates generally to cleaner teeth for use on compacting machines to clean debris from an area between adjacent compacting tips disposed on the compacting wheel and more particularly to the structure of the respective cleaner teeth.

BACKGROUND ART

Various types of cleaner teeth or bars have been used in the past to clean debris from an area on a compacting wheel between adjacent rows of compacting tips. In most applications, the cleaner teeth or bars are rectangular in shape and oriented with respect to the compacting wheel in order to scrape the clogged debris from the area between the rows of compacting tips. In many of these arrangements, the force needed to remove the debris is relatively high. In other applications, the cleaner teeth or bars are angled with respect to the compacting wheel to offset the higher forces needed to remove the debris. These arrangements are not totally effective when the compacting wheel is operated in the opposite direction since debris wedges between the compacting wheel and the cleaner teeth or bars. In the few applications in which the debris can be removed from the compacting wheel in either direction of rotation, the removal forces remain high and the respective designs are more complicated and expensive to produce.

The present invention is directed to overcoming one or more of the problems as set forth above.

DISCLOSURE OF THE INVENTION

In one aspect of the present invention, a cleaner tooth is provided and adapted for use on a compacting machine having a compacting wheel, and operative, in use, to clean debris from the area between adjacent rows of compacting tips disposed on the compacting wheel. The cleaner tooth includes a fastening portion and a cleaning portion. The fastening portion has an upper surface, a lower surface, opposed side surfaces, and a slot defined therein generally centrally disposed between the opposed side surfaces. The cleaning portion has a forward end portion, opposed spaced apart side surfaces, a trailing lower surface, and an arcuate upper surface that merges with the trailing lower surface generally at the forward end portion thereof.

This structure provides a cleaner tooth that is located in close proximity to the compacting wheel and is effective to substantially reduce the efforts needed to clean the debris from the area between adjacent rows of compacting tips located on the compacting wheel. Furthermore, the structure of the subject cleaner tooth is simple and relatively inexpensive to produce.

BRIEF DESCRIPTION OF THE DRAWINGS

FIG. 4 is a view of the embodiment of the present invention taken generally along the line 4—4 of FIG. 3; and FIG. 5 is a bottom view of the subject embodiment removed from the assembled position of FIG. 4.

BEST MODE FOR CARRYING OUT THE INVENTION

Figure 1:
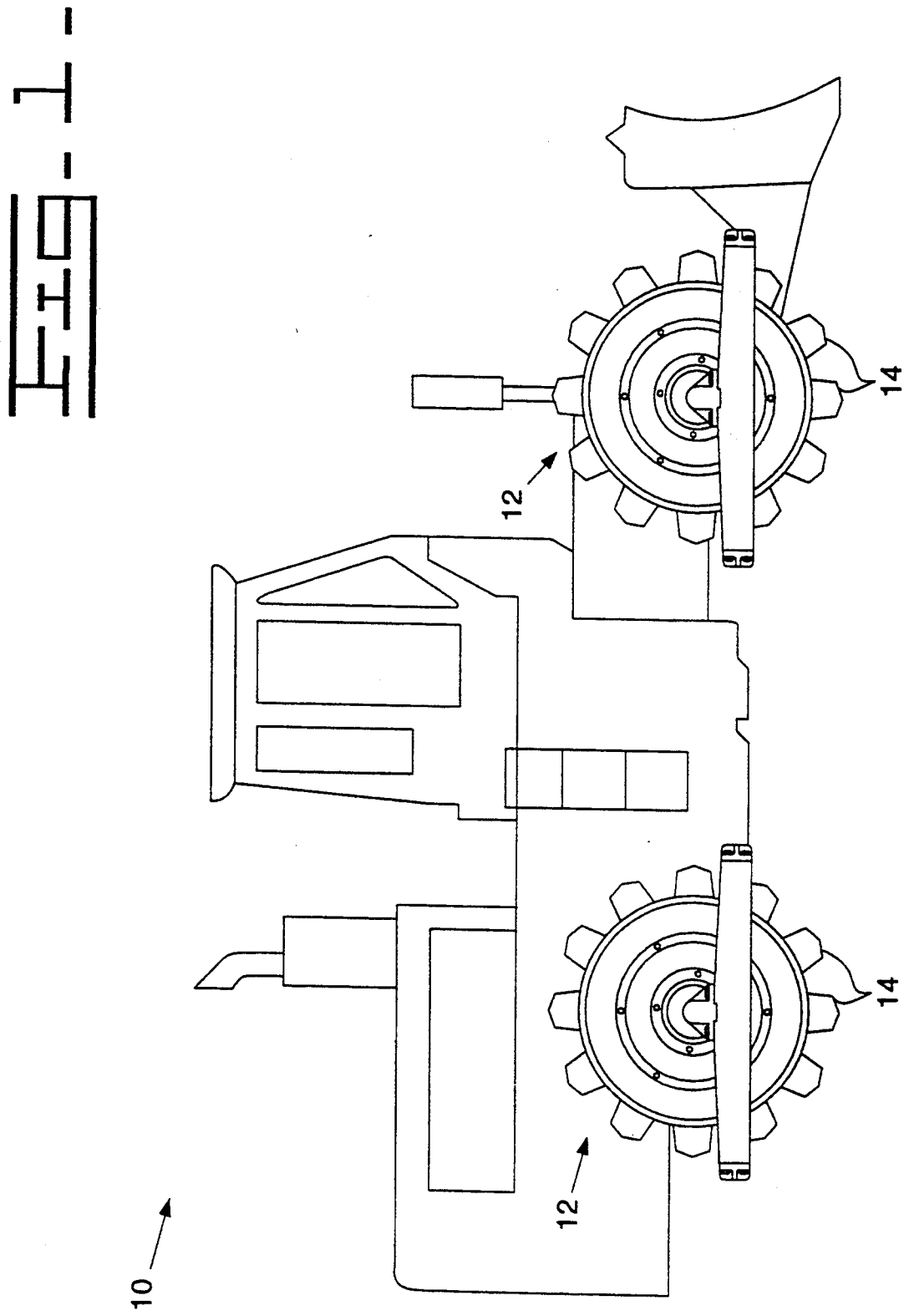
FIG. 1 is a plan view of a compacting machine having four separate compacting wheels located thereon.
Figure 2:
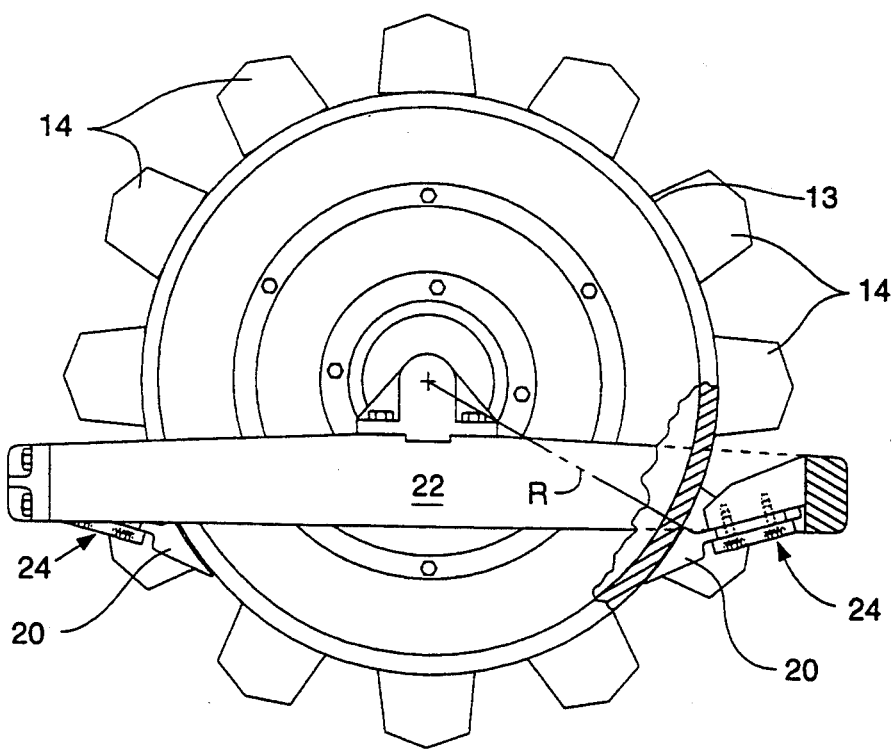
FIG. 2 is a plan view of one of the compacting wheel with a portion thereof broken away to illustrate an embodiment of the present invention in its installed position.
Figure 3:
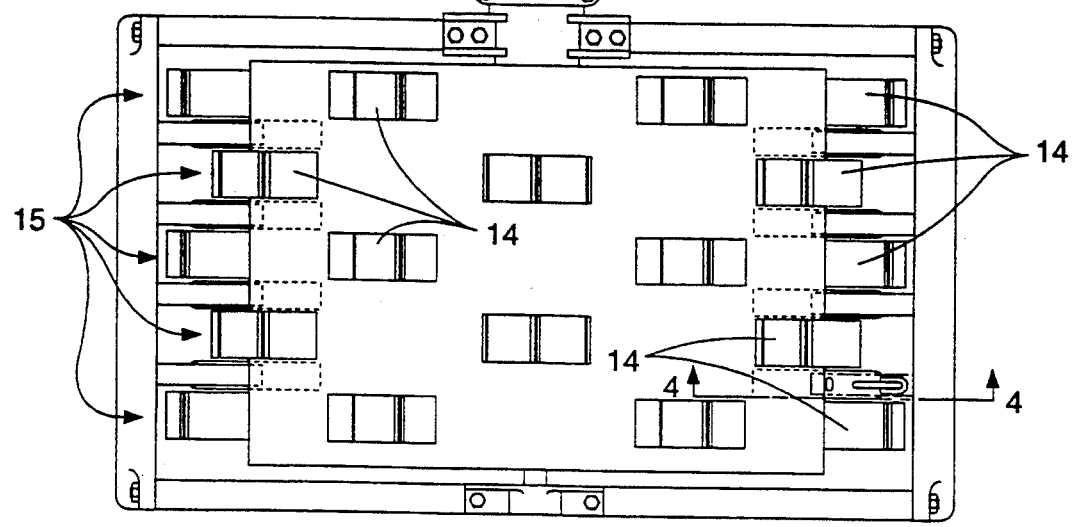
FIG. 3 is a top view of the compacting wheel of FIG. 2.

Referring to the drawings and more particularly to FIGS. 1, 2 and 3, a compacting machine 10 is illustrated. The compacting machine 10 includes a plurality of compacting wheels 12 each having a peripheral surface 13. Each of the compacting wheels 12 has a plurality of compacting tips 14 secured to the peripheral surface 13 thereof. The plurality of compacting tips 14 are arranged around the peripheral surface 13 of the compacting wheel 12 in spaced apart rows 15 as clearly illustrated in FIG. 3.

A cleaner tooth 20 is secured to a frame 22 and oriented generally adjacent the compacting wheel 12 between the respective rows 15 of the compacting tips 14. The frame 22 is secured to the compacting machine 10 and maintains the respective cleaner teeth 20 in their respective assembled positions.

As clearly illustrated in FIGS. 2 and 3, a portion of the cleaner teeth 20 are oriented between each of the respective rows 15 of the compacting tips 14 at the front of the compacting wheel 12. Another portion of the cleaner teeth 20 are located between the respective rows 15 of the compacting tips 14 at the rear of the compacting wheel 12. The cleaner teeth 20 are secured to the frame 22 by a fastening mechanism 24.

Referring now to FIGS. 4 and 5, the cleaner tooth 20 is illustrated in greater detail. In FIG. 4, a plan view of the cleaner tooth 20 is shown and, as illustrated, is secured to the frame 22 in its assembled position by the fastening mechanism 24.

The cleaner tooth 20 has a fastening portion 28 and a cleaning portion 30. The fastening portion 28 has an upper surface 32, a lower surface 34, opposed side surfaces 36,38 and a slot 40 defined therein centrally located between the opposed side surfaces 36,38.

The cleaning portion 30 has a forward end portion 44, opposed spaced apart side surfaces 46,48, a trailing lower surface 50, and an arcuate upper surface 52. The arcuate upper surface 52 intersects the trailing lower surface 50 at the forward end portion 44 thereof. The arcuate upper surface 52 has a concave shape that is defined by a radius "R" of a predetermined length. The length of the radius of the arcuate upper surface 52 is generally the same as the length of the radius of the compacting wheel 12. An angle of less than 30 degrees is formed by the trailing lower surface 50 and a plane 56 that is tangent to the arcuate upper surface 52 at a location generally adjacent the forward end portion 44. In the subject arrangement illustrated in FIG. 4, the angle formed is generally 20 degrees.

The cleaning portion 30 also includes a rearward end portion 58 having a shoulder surface 60 that interconnects the arcuate upper surface 52 with the upper surface 32 of the fastening portion 28. The shoulder surface 60 is generally perpendicular to a second plane 62 that is tangent to the arcuate upper surface 52 generally at the intersection of the shoulder surface 60 with the arcuate upper surface 52.

An opening 64 in the form of a slot is defined in the cleaning portion 30 and oriented therein parallel with and spaced from the forward end portion 44.

It is recognized that various forms of the cleaner tooth 20 could be utilized without departing from the essence of the invention. For example, even though the shoulder surface 60 is described as being perpendicular to the second plane 62, it is recognized that the angle formed by the surfaces thereof could be an acute angle. Furthermore, the opening 60 could be of different sizes and/or shapes. Likewise, the slot 40 in the fastening portion 28 could be two separate slots as opposed to the one continuous slot 40 illustrated.

INDUSTRIAL APPLICABILITY

The operation of the cleaner tooth 20 is best illustrated in FIG. 2. The arcuate upper surface 52 of the cleaning portion 30 is located in close proximity to the outer peripheral surface 13 of the compacting wheel 12 between the respective rows 15 of the compacting tips 14. The cleaning tooth 20 is positioned with respect to the compacting wheel 12 so that only a small space is permitted therebetween to prevent the outer peripheral surface 13 of the compacting wheel 12 from rubbing the arcuate outer surface 52 of the cleaning tooth 20. The forward end portion 44 of the cleaning portion 30 effectively cuts or shears the debris from the space between the respective compacting tips 14 with minimal effort since the angle formed between the trailing lower surface 50 and the arcuate upper surface 52 is less than 30 degrees. If the compacting wheel 12 is turning in the clockwise direction, as viewed in FIG. 2, the cleaner tooth 20 on the left side cuts or shears the debris from the space between the respective rows 15 of compacting tips 14.

In the event debris is wedged between the respective rows 15 of compacting tips 14 in an area above the frame 22 such that the cleaning tooth 20 does not have the opportunity to remove it, the shoulder surface 60 is effective to force the debris from the space therebetween. This eliminates the problem of the debris becoming wedged between the peripheral surface 13 of the compacting wheel 12 and the arcuate outer surface 52 of the compacting tooth 20. Even though a greater effort is needed for the shoulder surface 60 to remove the debris from the area above the frame 22, the frequency of the debris being trapped in this area is minimal. Consequently, the added benefit of eliminating debris from wedging between the compacting wheel 12 and the clearer tooth 20 far outweighs the extra effort needed to remove the debris.

Preferably, as illustrated in FIG. 2, a plurality of cleaner teeth 20 are disposed on the right side of the compacting wheel 12 and another plurality thereof are disposed on the left side of the compacting wheel 12. However, it is recognized that a plurality of cleaner teeth 20 could be located only on one side of the compacting wheel 12 without departing from the essence of the invention.

In view of the foregoing, it is readily apparent that the structure of the present invention provides a cleaner tooth 20 having a structural shape that is both simple in construction and, in use, removes debris from an area between the compacting tips 14 with minimal effort.

Other aspects, objects, and advantages of this invention can be obtained through a study of the drawings, the disclosure, and the appended claims.

We claim:

1. A cleaner tooth adapted for use on a compacting machine having a compacting wheel and operative, in use, to clean debris from an area between adjacent rows of compacting tips disposed on the compacting wheel, the cleaner tooth comprising:

a fastening portion having an upper surface substantially parallel to a lower surface, opposed side surfaces, and a slot generally centrally disposed in said fastening portion and substantially parallel to each of the opposed side surfaces; and a cleaning portion having a forward end portion, opposed spaced apart side surfaces, a trailing lower surface, an arcuate concave upper surface that defines a radius of a predetermined length and that merges with the trailing lower surface generally at the forward end portion thereof, in use, the concave arcuate upper surface is positioned immediately adjacent the compacting wheel between the rows of compacting tips, the intersection of the trailing lower portion and a plane tangent to the arcuate upper surface generally adjacent the forward end portion thereof forms an angle less than 30 degrees, and the cleaning portion has a rearward end portion and the rearward end portion has a shoulder surface interconnecting the arcuate upper surface of the cleaning portion with the upper surface of the fastening portion.

2. The cleaner tooth of claim 1 including a second plane tangent to the arcuate upper surface generally at the intersection of the shoulder surface and the arcuate upper surface and the shoulder surface being generally perpendicular to the second plane.

3. The cleaner tooth of claim 2 wherein the cleaning portion has an opening defined therein between the arcuate upper surface and the trailing lower surface and located therein spaced from the forward end portion.

4. The cleaner tooth of claim 3 wherein the forward end portion is planar and the opening in the cleaning portion is a through slot disposed generally parallel with the forward end portion thereof.

5. The cleaner tooth of claim 4 wherein the radius of the concave arcuate upper surface is substantially the same as the radius of the compacting wheel.

* * * * *